(12) United States Patent
Isson et al.

(10) Patent No.: US 12,499,136 B2
(45) Date of Patent: Dec. 16, 2025

(54) METHOD FOR UPDATING A DATABASE OF A GEOLOCATION SERVER

(71) Applicant: UNABIZ, Labege (FR)

(72) Inventors: Olivier Isson, Lauzerville (FR); Renaud Marty, Ramonville Saint Agne (FR); Maxime Tregaro, Toulouse (FR); Robert Chevallier, Boulogne Billancourt (FR); Juan Carlos Zuniga, Québec (CA); Julien Boite, Lanta (FR)

(73) Assignee: UNABIZ, Labege (FR)

( * ) Notice: Subject to any disclaimer, the term of this patent is extended or adjusted under 35 U.S.C. 154(b) by 52 days.

(21) Appl. No.: 18/555,831

(22) PCT Filed: Apr. 13, 2022

(86) PCT No.: PCT/EP2022/059855
§ 371 (c)(1),
(2) Date: Oct. 17, 2023

(87) PCT Pub. No.: WO2022/223388
PCT Pub. Date: Oct. 27, 2022

(65) Prior Publication Data
US 2024/0202219 A1    Jun. 20, 2024

(30) Foreign Application Priority Data
Apr. 20, 2021   (FR) ...................... 2104083

(51) Int. Cl.
*G06F 16/29*    (2019.01)
*G01S 5/00*     (2006.01)
(Continued)

(52) U.S. Cl.
CPC .......... *G06F 16/29* (2019.01); *G06F 16/2282* (2019.01); *G06F 16/23* (2019.01); *H04W 64/00* (2013.01)

(58) Field of Classification Search
CPC ...... G06F 16/29; G06F 16/2282; G06F 16/23; H04W 64/00; H04W 4/02; G01S 5/0244; G01S 5/0242; G01S 5/0036
See application file for complete search history.

(56) References Cited

U.S. PATENT DOCUMENTS

| | | | | |
|---|---|---|---|---|
| 10,496,993 | B1 * | 12/2019 | Mulliner | G06Q 20/401 |
| 2002/0080063 | A1 * | 6/2002 | Bloebaum | G01S 19/252 |
| | | | | 342/357.43 |

(Continued)

FOREIGN PATENT DOCUMENTS

CA    3138407 A1    11/2020

OTHER PUBLICATIONS

International Search Report for PCT/EP2022/059855 mailed Jun. 20, 2022, 5 pages.

(Continued)

Primary Examiner — Robert W Beausoliel, Jr.
Assistant Examiner — Mohammad S Bhuyan
(74) Attorney, Agent, or Firm — NIXON & VANDERHYE (57) ABSTRACT

Disclosed is a method for updating a database of a geolocation server using a wireless communication system. The database includes a table associating an identifier of a transmitting device with at least one piece of information on its geographical position. The communication system includes an access network and a terminal communicating with the access network and with the transmitting devices according to two distinct protocols. The terminal receives a message emitted by a transmitting device and including an identifier of the transmitting device. The terminal emits a message with this identifier to the access network. The access network determines a piece of information on the geographical position of the terminal. A consistency check is (Continued)

performed between the piece of position information of the terminal determined by the access network and the piece of position information present in the table. The table is updated based on the consistency check.

17 Claims, 4 Drawing Sheets

(51) Int. Cl.
   *G01S 5/02* (2010.01)
   *G06F 16/22* (2019.01)
   *G06F 16/23* (2019.01)
   *H04W 4/02* (2018.01)
   *H04W 64/00* (2009.01)

(56) References Cited

U.S. PATENT DOCUMENTS

| | | |
|---|---|---|
| 2007/0202888 A1 | 8/2007 | Brachet et al. |
| 2015/0072714 A1* | 3/2015 | Froehlich ............... H04W 4/023 455/457 |
| 2020/0019580 A1 | 1/2020 | Kim et al. |
| 2020/0022103 A1* | 1/2020 | Kim ....................... G01S 5/0263 |
| 2020/0128383 A1* | 4/2020 | Maier ..................... B63B 45/00 |
| 2020/0280845 A1* | 9/2020 | Mercadie ............. H04W 12/065 |
| 2020/0296542 A1* | 9/2020 | Gilson ................... H04B 17/27 |

OTHER PUBLICATIONS

Written Opinion of the ISA for PCT/EP2022/059855 mailed Jun. 20, 2022, 7 pages.
1 Office Action, issued in European Patent Application No. 22722527.3 dated Mar. 25, 2025.

* cited by examiner

METHOD FOR UPDATING A DATABASE OF A GEOLOCATION SERVER

CROSS-REFERENCE TO RELATED APPLICATIONS

This application is the U.S. national phase of International Application No. PCT/EP2022/059855 filed Apr. 13, 2022 which designated the U.S. and claims priority to FR 2104083 filed Apr. 20, 2021, the entire contents of each of which are hereby incorporated by reference.

FIELD OF THE INVENTION

The present invention relates to the update of a geolocation server which includes a database associating an identifier of a transmitting device (for example an access point of a wireless local area network) with the geographical position of the transmitting device. The update of the database of the geolocation server is based on the use of an access network of a wireless communication system based on a communication protocol different from that used by the transmitting device (the access network is for example a wireless wide area network). The access network is capable of independently determining a piece of information on the geographical position of a terminal which communicates with the access network.

PRIOR ART

There are currently several geolocation systems based on a database associating an identifier of a transmitting device (for example a WiFi or Bluetooth access point) with the geographical position of the transmitting device.

In such a geolocation system, a terminal receives on a beacon signal emitted by a transmitting device, a message including an identifier of said transmitting device. Afterwards, the terminal sends a query message to a geolocation server. The query message includes the identifier of the transmitting device. The geolocation server includes a database with a table associating identifiers of transmitting devices and their respective geographical positions. The geolocation server could then determine the geographical position associated with said transmitting device, then send this piece of information to the terminal in a reply message. The geographical position of the transmitting device corresponds to an estimated geographical position of the terminal.

The geographical position of the terminal may possibly be refined according to a power level with which the beacon signal is received by the terminal. It is also possible to estimate the geographical position of the terminal according to the geographical position of several different transmitting devices whose terminal has received the beacon signal at a given time point.

A major problem for the supplier of such a geolocation system is to keep the database up-to-date. Indeed, the geographical position of a transmitting device could change over time, and in this case the database should be updated so that the association between an identifier of a transmitting device and its geographical position remains correct. Also, a new transmitting device that is not recorded in the database may appear over time, and in this case the database should be updated by adding the identifier of the new transmitting device with an associated piece of position information.

When a terminal sends a query message including the identifiers of a quite large number (for example at least four or five) of several different transmitting devices whose terminal has received the beacon signal at a given time point, it is possible to detect whether the geographical position associated with one of the identifiers is not consistent with the geographical positions associated with the other identifiers. If so is the case, it is possible to correct in the table the geographical position associated with the identifier for which there is an inconsistency. The geographical position for which there is an inconsistency may be corrected according to the other geographical positions which are consistent with each other.

Nonetheless, such a solution does not work when only a small number of identifiers are emitted in the query message (for example only one or two). This is generally the case when the communication between the terminal and the geolocation server is supported by a low-speed, low-power network, like for example an IoT (acronym for "Internet Of Things") or M2M (acronym for "Machine To Machine") type network.

Another solution for updating the database may consist in regularly setting up an update campaign in which calibration terminals equipped with a positioning system (for example a GPS receiver) are moved over a target territory to send to the geolocation server a message comprising both the identifier of a transmitting device and the geographical position of the calibration terminal. Nonetheless, such a solution is particularly expensive and it generally does not allow for frequent and exhaustive updates.

DISCLOSURE OF THE INVENTION

An objective of the present invention is to overcome all or part of the drawbacks of the prior art, in particular those set out hereinbefore.

To this end, and according to a first aspect, a method is provided by the present invention for updating a database of a geolocation server using a wireless communication system. The database includes a table storing identifiers of transmitting devices, each transmitting device identifier is associated in the table with at least one piece of position information representative of the geographical position of the transmitting device. The wireless communication system includes an access network and at least one terminal adapted to exchange messages with the access network according to a first wireless communication protocol and to receive messages emitted by the transmitting devices according to a second wireless communication protocol. The method comprises the following steps of:

detecting, by the terminal, for at least one transmitting device, an identifier of said transmitting device from a message emitted by said transmitting device according to the second wireless communication protocol, emitting, by the terminal, to the access network and according to the first wireless communication protocol, a message including the identifier of the transmitting device, determining, by the access network, without using the geolocation server, a piece of position information representative of the geographical position of the terminal.

An alternative then arises depending on whether the identifier of the transmitting device detected by the terminal and received by the access network is present or not in the table of the database of the geolocation server. The method implements at least one of the following two possibilities associated with this alternative:

when the identifier of the transmitting device is present in the table:

checking consistency between the piece of position information of the terminal determined by the access network and at least one piece of position information associated with the identifier of the transmitting device in the table, updating the table according to the result of the consistency check, when the identifier of the transmitting device is not present in the table:

updating the table by adding the identifier of the transmitting device associated with a piece of position information determined according to the piece of position information of the terminal determined by the access network.

Advantageously, the invention is based on the fact that the access network is capable of determining a piece of information on the geographical position of the terminal independently (i.e. without using the geolocation server).

When the identifier of the transmitting device is not present in the table, the piece of position information of the terminal determined by the access network may allow adding in the table the identifier of the transmitting device associated with a piece of position information.

In the case where the identifier of the transmitting device is present in the table, the piece of position information of the terminal determined by the access network may allow checking the validity of at least one piece of position information associated with the transmitting device in the table of the geolocation server. A piece of position information of the transmitting device in the table of the geolocation server is considered to be valid if the piece of position information of the terminal determined by the access network is consistent with the piece of position information of the transmitting device in the table of the geolocation server. The piece of position information of the terminal determined by the access network and the piece of position information associated with the identifier of the transmitting device in the table are considered to be consistent with each other if they are representative of geographical positions that are close enough to each other. The table of the geolocation server could then be updated, for example to validate, invalidate or correct the piece of position information of the transmitting device according to the result of the consistency check. The consistency check may be done both by the access network and by the geolocation server.

Thus, the piece of position information of the terminal determined by the access network may allow updating the database of the geolocation server by adding a new element (when said element is not present in the table) and/or by modifying an element (when said element is already present in the table).

A piece of position information may directly correspond to a geographical position (defined for example by a set of longitude, latitude and possibly altitude coordinates). Nonetheless, a piece of position information may also correspond to a piece of contextual information, i.e. a parameter allowing estimating the geographical position of the transmitting device (an index, an address, a store name, a neighbourhood, region or country name, etc.).

Advantageously, a message emitted by the terminal to the access network may be used to update the database of the geolocation server even though the message has not been emitted by the terminal in order to geolocate the terminal. Thus, this enables the provider of the access network to offer to the provider of the geolocation server a maintenance service for the database of the geolocation server based on messages exchanged between terminals and the access network for a service that may be completely independent of the geolocation service offered by the geolocation server. In concrete terms, this means that the geolocation server does not necessarily emit a response following the reception of a message including the identifier of a transmitting device.

The present invention finds a particularly advantageous, yet non-limiting, application for a low-speed and low-consumption extended access network, like for example an IoT or M2M type network.

In particular implementations, the invention may further include one or more of the following features, considered separately or in any technically feasible combination.

In particular implementations, the consistency check step includes:

emitting, by the access network, to the geolocation server, a message including the piece of position information of the terminal determined by the access network and the identifier of the transmitting device, determining, by the geolocation server, said at least one piece of position information associated with the identifier of the transmitting device in the table, comparing, by the geolocation server, the piece of position information of the terminal determined by the access network with said at least one piece of position information associated with the identifier of the transmitting device in the table.

In particular implementations, the consistency check step includes:

emitting, by the access network, to the geolocation server, a query message including the identifier of the transmitting device, determining, by the geolocation server, said at least one piece of position information associated with the identifier of the transmitting device in the table, emitting, by the geolocation server, to the access network, a reply message including said at least one piece of position information associated with the identifier of the transmitting device in the table, comparing, by the access network, the piece of position information of the terminal determined by the access network with said at least one piece of position information associated with the identifier of the transmitting device in the table.

In particular implementations, the comparison of the piece of position information of the terminal determined by the access network with said at least one piece of position information associated with the identifier of the transmitting device in the table includes:

estimating a first geographical position from the piece of position information of the terminal determined by the access network, estimating a second geographical position from said at least one piece of position information associated with the identifier of the transmitting device in the table, comparing a distance between the first geographical position and the second geographical position with a threshold value.

In particular implementations, the comparison of the piece of position information of the terminal determined by the access network with said at least one piece of position information associated with the identifier of the transmitting device in the table further includes:

determining a first value representative of a level of accuracy of the estimate of the first geographical position, and/or determining a second value representative of a level of accuracy of the estimate of the second geographical position, and the threshold value is defined according to the first value and/or according to the second value.

In particular implementations, the update of the table according to the result of the consistency check includes replacing, in the table, said at least one piece of position information associated with the transmitting device by the piece of position information of the terminal determined by the access network.

In particular implementations, the table can include at least two pieces of position information associated with the same transmitting device, each piece of position information being also associated with a trust value representative of the trust given to said piece of position information for said transmitting device. The update of the table according to the result of the consistency check includes adding, in the table, an association between the transmitting device and the piece of position information of the terminal determined by the access network, and/or updating, in the table, the trust values of the different pieces of position information associated with the transmitting device.

In particular implementations, at least the consistency check step and the table update step are delayed until a particular criterion is met.

In particular implementations, the particular criterion is met when a predetermined waiting period has expired, and/or when a number of received messages including at least one transmitting device identifier is greater than a predetermined threshold, and/or when a number of received transmitting device identifiers is greater than a predetermined threshold.

In particular implementations, several identifiers of different transmitting devices detected by the terminal are received by the access network in one single message emitted by the terminal or in several messages emitted by the terminal during a predetermined period of time. For at least one of the received identifiers, so-called "identifier of interest", the consistency check comprises:
  determining a piece of position information from the pieces of position information associated in the table with a plurality of identifiers among the received identifiers, the identifier of interest being included in said plurality of identifiers,
  a first check of consistency of the piece of position information thus determined with the piece of position information of the terminal determined by the access network,
  if the first consistency check indicates an inconsistency, a second consistency check between the piece of position information associated in the table with the identifier of interest and the piece of position information of the terminal determined by the access network.

In particular implementations, the first wireless communication protocol has a range longer than the range of the second wireless communication protocol.

In particular implementations, the first wireless communication protocol is a communication protocol of a wireless wide area network or of a low-power wireless wide area network.

In particular implementations, the second wireless communication protocol is a communication protocol of a wireless local area network, a communication protocol of a wireless personal area network or a short-distance communication protocol According to a second aspect, the present invention relates to a server of an access network of a communication system used to update a database of a geolocation server. The database includes a table storing identifiers of transmitting devices, each transmitting device identifier is associated in the table with at least one piece of position information representative of the geographical position of the transmitting device. The wireless communication system also includes at least one terminal adapted to exchange messages with the access network according to a first wireless communication protocol and for receiving messages transmitted by the transmitting devices according to a second protocol wireless communication. The server of the access network is configured to implement any one of the previously-described implementations. In particular, the server is configured to:
  receive a message emitted by the terminal according to the first wireless communication protocol, said message including at least one identifier of a transmitting device detected by the terminal,
  determine, without using the geolocation server, a piece of position information representative of the geographical position of the terminal,
  emit to the geolocation server a query message including the identifier of the transmitting device.
An alternative arises depending on whether the identifier of the transmitting device detected by the terminal and received by the access network is present or not in the table of the database of the geolocation server. The server is configured to implement either one or both of the following possibilities of this alternative:
  when the identifier of the transmitting device is present in the table:
    receiving from the geolocation server a reply message including at least one piece of position information associated with the identifier of the transmitting device in the table,
    checking consistency between the piece of position information of the terminal determined by the access network and said at least one piece of position information associated with the identifier of the transmitting device in the table,
    emitting a message intended to update the table according to the result of the consistency check
  when the identifier of the transmitting device is not present in the table:
    emitting a message intended to add into the table the identifier of the transmitting device associated with a piece of position information determined according to the piece of position information of the terminal determined by the access network.

According to a third aspect, the present invention relates to an access network including a server as previously described.

In particular embodiments, the access network being a wireless wide area network or a low-power wireless wide area network.

In particular embodiments, the access network being an access network of an ultra-narrowband communication system.

PRESENTATION OF THE FIGURES

The invention will be better understood upon reading the following description, given as a non-limiting example, and made with reference to FIGS. 1 to 5 which show.

In these figures, identical references from one figure to another refer to identical or similar elements. For clarity, the represented elements are not necessarily plotted to the same scale, unless stated otherwise.

DETAILED DESCRIPTION OF AN EMBODIMENT OF THE INVENTION

Figure 1:
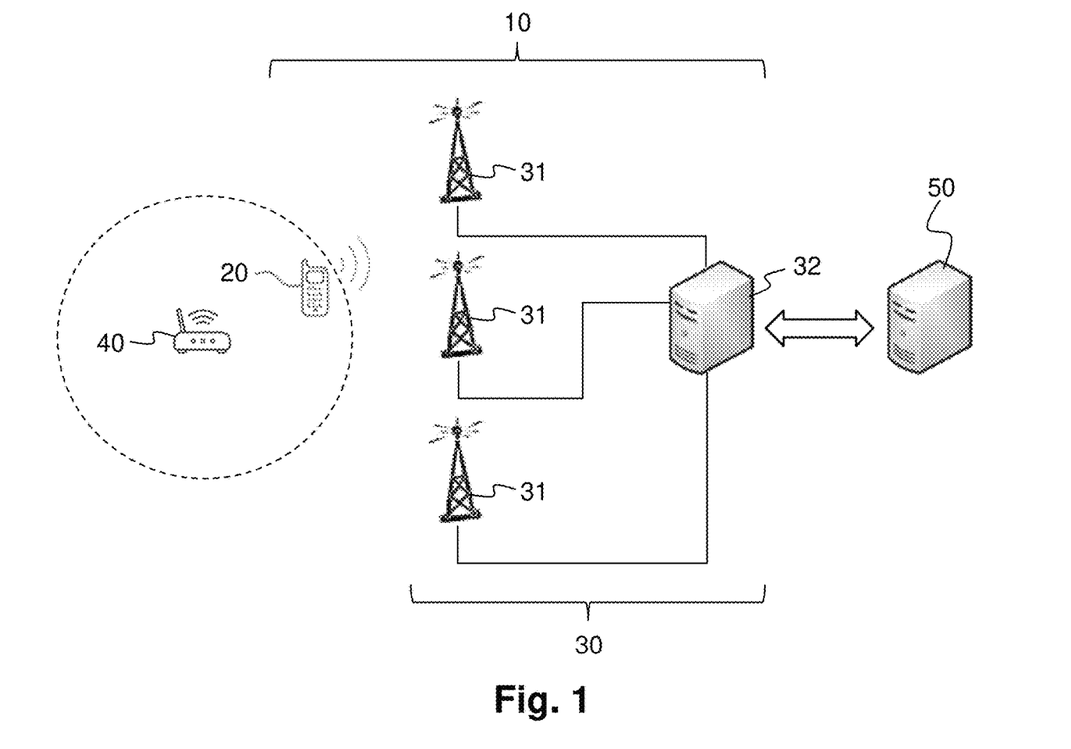
FIG. 1 a schematic illustration of an embodiment of a wireless communication system used to update a geolocation server, FIG. 2 a schematic illustration of an embodiment of a terminal, FIG. 3 a schematic illustration of the main steps of a method for updating a geolocation server, FIG. 4 a schematic illustration of the main steps of a first particular implementation of a method for updating a geolocation server, FIG. 5 a schematic illustration of the main steps of a second particular implementation of a method for updating a geolocation server.

FIG. 1 schematically shows a wireless communication system 10, including at least one terminal 20 and an access network 30 including several base stations 31.

The terminal 20 is adapted to emit messages on an uplink to the access network 30. Each base station 31 is adapted to receive the messages from the terminal 20 when said terminal is within its range. Conventionally, a message emitted by the terminal 20 includes an identifier of the terminal 20. For example, each message received by a base station is transmitted to a server 32 of the access network 30, possibly accompanied by other information such as an identifier of the base station 31 that has received it, the reception power level of said received message, the time of arrival of said message, the frequency at which the message has been received, etc. For example, the server 32 processes all of the messages received from the different base stations 31.

The wireless communication system 10 may be unidirectional, i.e. it enables exchanges of messages only on the uplink from the terminal 20 to the access network 30. However, according to other examples, nothing excludes the possibility of two-way exchanges. Where appropriate, the access network 30 is also adapted to emit, via the base stations 31, messages on a downlink intended for the terminal 20, which is adapted to receive them.

The exchanges of messages on the uplink intended for the access network 30 use a first wireless communication protocol.

In particular embodiments, the first wireless communication protocol is a wireless wide area network communication protocol ("Wireless Wide Area Network" or WWAN). For example, the first wireless communication protocol is a standardised communication protocol of the UMTS ("Universal Mobile Telecommunications System"), LTE ("Long Term Evolution"), LTE-Advanced Pro, 5G, etc., type.

Alternatively, the first wireless communication protocol is a low-power wireless wide area network communication protocol ("Low Power Wide Area Network" or LPWAN). Such a wireless communication system is a long-range access network (longer than one kilometre, and even longer than a few tens of kilometres), with low energy consumption (for example an energy consumption during the transmission or the reception of a message lower than 100 mW, and possibly lower than 50 mW, and even lower than 25 mW), and whose data rates are generally lower than 1 Mbits/s. Among examples of LPWAN networks, mention may be made of Sigfox, LoRaWAN, Ingenu, Amazon Sidewalk, Helium, etc. Such wireless communication systems are particularly suitable for IoT or M2M type applications.

For example, the first wireless communication protocol is a proprietary ultra-narrowband communication protocol. By "ultra narrowband" ("Ultra Narrow Band" or UNB), it should be understood that the instantaneous frequency spectrum of the radiofrequency signals emitted by the terminals has a frequency width of less than two kilohertz, and possibly less than one kilohertz.

In an IoT or M2M type communication system, the data exchanges are essentially unidirectional, in this case on an uplink from the terminals 20 to the access network 30 of the wireless communication system 10. In order to minimise the risks of losing a message emitted by a terminal 20, planning of the access network is often carried out such that a given geographical area is covered simultaneously by several base stations 31, such that a message emitted by a transmitting device 20 could be received by several base stations 31.

As illustrated by FIG. 1, the terminal 20 is also adapted to receive messages emitted by at least one transmitting device 40, which is in the vicinity of said terminal 20. The messages emitted by the transmitting device 40 use a second wireless communication protocol, different from the first wireless communication protocol. It should be noted that the transmitting device 40 could be entirely independent of the wireless communication system 10, and it does not have to support the first wireless communication protocol.

In particular embodiments, the second wireless communication protocol has a shorter range than the range of the first wireless communication protocol. In such a case, the geographical position of the transmitting device 40, within the range of which the terminal 20 is located, provides more accurate information on the geographical position of the terminal 20, for example, than the geographical position of a base station 31 which receives a message emitted by the terminal 20. In the case where the first wireless communication protocol is a wireless wide area network communication protocol, the second wireless communication protocol is for example a wireless local area network communication protocol ("Wireless Local Area Network" or WLAN), for example of the WiFi type (IEEE 802.11 standards), etc., or a wireless personal area network communication protocol ("Wireless Personal Area Network" or WPAN), for example of the Bluetooth or BLE type (acronym for "Bluetooth Low Energy"), etc. According to still another example, the second wireless communication protocol may be a short-distance communication protocol based for example on the NFC technology (acronym for "Near Field Communication") or on the RFID technology (acronym for "Radio Frequency Identification").

However, it should be noted that it is also possible, according to other examples, to have a second wireless communication protocol whose range is not shorter than that of the first wireless communication protocol.

A geolocation server 50 includes a database including a table memorizing identifiers of transmitting devices 40. Each transmitting device 40 identifier is associated in the table with at least one piece of position information representative of the geographical position of the transmitting device 40.

For example, an identifier of a transmitting device 40 corresponds to a MAC address of the transmitting device 40 (MAC is the acronym for "Media Access Control"). Nonetheless, other parameters could serve as an identifier for a transmitting device 40, like for example an SSID (acronym for "Service Set IDentifier"), a BSSID (acronym for "Base Service Set Identifier"), an identifier of a Bluetooth or BLE access point, an identifier of an RFID tag, etc.

The piece of position information may directly consist of coordinates (longitude, latitude and possibly altitude) of a geographical position of the transmitting device 40. Nonetheless, the piece of position information may also consist of contextual information allowing estimating the geographical position of the terminal 20 or of the transmitting device 40, like for example an address, a store name, a neighbourhood, region or country name, etc.

For example, the geolocation server 50 is connected to the server 32 of the access network 30 by an Internet connection.

When the terminal 20 is within the range of the second communication protocol, it can receive from the transmitting device 40 a message including an identifier of said transmitting device 40. Afterwards, the terminal 20 can send a query message to the geolocation server 50 through the access network 30. The query message includes the identifier of the transmitting device 40. The geolocation server 50 can then determine the geographical position associated with the transmitting device 40. The geographical position of the transmitting device 40 can then be used to estimate the estimated geographical position of the terminal.

Figure 2:
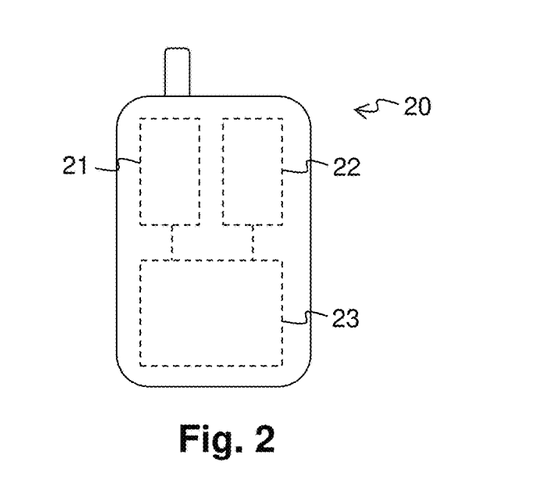

FIG. 2 schematically shows an embodiment of a terminal 20.

As illustrated by FIG. 2, the terminal 20 includes a first communication module 21 adapted to exchange messages with the base stations 31 according to the first wireless communication protocol. For example, the first communication module 21 is in the form of a radiofrequency circuit including equipment (antenna, amplifier, local oscillator, mixer, analogue filter, etc.).

The terminal 20 also includes a second communication module 22 adapted to receive messages emitted by the transmitting device of interest 40, according to the second wireless communication protocol. For example, the second communication module 22 is in the form of a radiofrequency circuit including equipment (antenna, amplifier, local oscillator, mixer, analogue filter, etc.).

Furthermore, the terminal 20 also includes a processing circuit 23, connected to the first communication module 21 and to the second communication module 22. For example, the processing circuit 23 includes one or more processor(s) and storage means (magnetic hard disk, electronic memory, optical disk, etc.) in which a computer program product is stored, in the form of a set of program code instructions to be executed to implement some steps of a method for updating the database of the geolocation server (cf. hereinafter).

Each of the server 32 of the access network 30 and the geolocation server 50 also includes one or more processor(s) and storage means in which a computer program product is stored, in the form of a set of code instructions program to be executed to implement some steps of a method for updating the database of the geolocation server (cf. Hereinafter).

Figure 3:
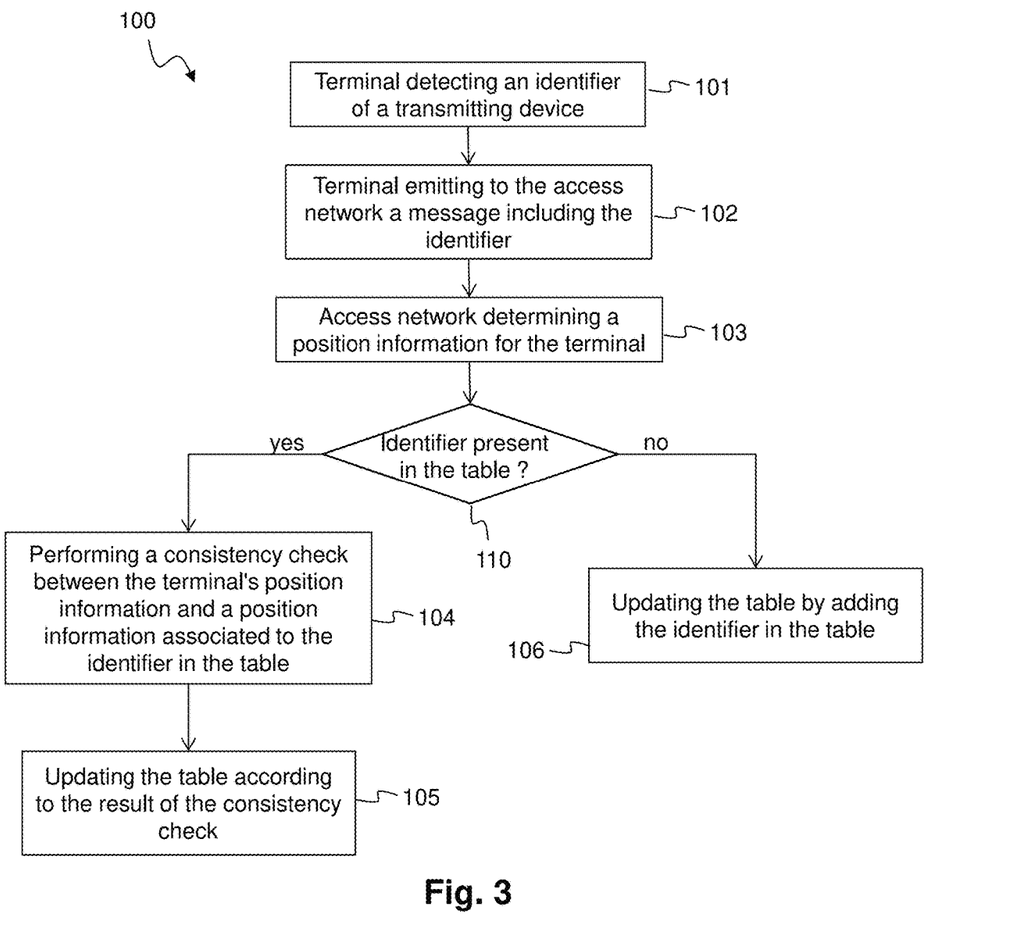

FIG. 3 schematically shows the main steps of a method 100 for updating a geolocation server 50.

In particular, the method 100 includes a step 101 of detecting, by the terminal 20, for at least one transmitting device 40, an identifier of said transmitting device 40 from a message emitted by said transmitting device 40 according to the second wireless communication protocol. The message includes an identifier of the transmitting device 40. For example, the message is emitted by the transmitting device 40 on a beacon signal broadcast for the attention of all terminals that are in the vicinity of the transmitting device 40, within the range of the second communication protocol.

Afterwards, the method 100 includes a step 102 of emitting, by the terminal 20, to the access network 30, a message including the identifier of the transmitting device 40. This message is emitted according to the first wireless communication protocol.

Afterwards, the method 100 includes a step 103 of determining, by the access network 30, without using the geolocation server 50, a piece of position information representative of the geographical position of the terminal 20.

The piece of position information of the terminal 20 may directly consist of coordinates (longitude, latitude and possibly altitude) of an estimated geographical position of the terminal 20. Nonetheless, the piece of position information of the terminal 20 may also consist of contextual information allowing estimating the approximate geographical position of the terminal 20, like for example an address, a store name, a neighbourhood, region or country name, etc. This contextual information may be obtained from a parameter contained in the message received from the terminal 20. For example, it is possible to determine in which region or in which country the terminal 20 is located from an identifier of the terminal if the access network knows that this terminal belongs to an operator who operates only in a region or in a particular country.

For example, the access network 30 is configured to estimate the geographical position of the terminal 20 according to messages received from said terminal 20. In particular implementations, the geographical position is estimated from the received message including the identifier of the transmitting device 40. However, according to other examples, nothing excludes estimating the geographical position of the terminal 20 from other messages emitted beforehand by the terminal 20.

In general, any method for estimating the geographical position may be implemented, and the choice of a particular method constitutes only one implementation variant of the invention. For example, the access network 30 may estimate the geographical position of the terminal 20 as being the geographical position of a base station 31 which has received a message emitted by the terminal 20. If several base stations 31 can receive a message emitted by the terminal 20, it is possible to estimate the geographical position of the terminal 20 according to the geographical positions of all base stations 31 that have received the message emitted by the terminal 20 (for example by defining a barycenter of these geographical positions).

According to another example, the access network 30 could estimate the distances that separate the terminal 20 from one or more base station(s) 31 by calculating the propagation time of a message emitted by the terminal 20 to the base stations 31 from the TOA measurements or from measurements of differences of times of arrival ("Time Difference of Arrival" or TDOA) of this message at the different base stations 31. Afterwards, it is then possible to estimate the position of the terminal 20 by multilateration if the geographical positions of the base stations 31 are known.

According to another example, it is possible to estimate the position of the terminal 20 by multilateration by determining the distances which separate the terminal 20 from several base stations 31 from an RSSI measurement for each base station 31 for a message emitted by the terminal 20 to the access network 30.

According to still another example, the method for estimating a geographical position of the terminal 20 by the access network 30 may be based on machine learning techniques which associate a fingerprint with a geographical position of the considered geographical area. Such a method is based on the assumption that a power level of reception by a base station 31 for a message emitted by the terminal 20 located at a given geographical position is stable over time. Concretely, this consists in building, during a first calibration phase, a database which associates with known geographical positions a "radio signature" corresponding to all of the RSSI measurements obtained for a terminal 20 at the considered geographical position for a set of base stations 31. Afterwards, during a search phase, a radio signature observed for the terminal 20 whose approximate geographical position is to be estimated is compared with all of the radio signatures in the database in order to estimate the approximate geographical position of the terminal 20 from the geographical position(s) corresponding to the radio signature(s) the most similar to the radio signature of the terminal 20.

In particular implementations, the estimation of the geographical position of the terminal 20 is performed by the access network 30 without any explicit information contributing to this estimation being sent by the terminal in a message intended for the access network (in other words, the terminal does not emit messages to the access network whose binary data include a piece of information allowing estimating the geographical position of the terminal). Such arrangements allow limiting the amount of data exchanged between the terminal and the access network to geolocate the terminal 20.

In particular implementations, the piece of position information of the terminal 20 is determined by the access network 30 from data included in the received message. For example, in the case where the terminal 20 is static (i.e. if it could be considered that it is always located at the same address), the access network 30 can memorize a table associating an identifier of a terminal and an address at which this terminal 20 is located. If the identifier of the terminal 20 is included in the message emitted by the terminal 20, the access network 30 can then determine the piece of position information of the terminal 20 as being the address associated with this identifier.

An alternative 110 then arises depending on whether the identifier of the transmitting device 40 detected by the terminal 20 and received by the access network 30 is already present in the table of the database of the geolocation server 50, or not. The method 100 implements at least one of the two possibilities associated with this alternative 110.

In the case where the identifier of the transmitting device 40 detected by the terminal 20 and received by the access network 30 is still not present in the table, the method includes an update 106 of the table by adding the identifier of the transmitting device 40 associated with a piece of position information determined according to the piece of position information of the terminal 20 determined by the access network 30. The piece of position information associated with the identifier of the transmitting device 40 may correspond directly to the piece of position information of the terminal 20. Nonetheless, the piece of position information associated with the identifier of the transmitting device 40 may also be determined according to other elements. In particular, the message emitted by the terminal 20 and including the identifier of the transmitting device 40 may include other identifiers of transmitting devices detected by the terminal 20. If these other identifiers are present in the table, the piece of position information associated with the identifier of the transmitting device 40 may then also be determined according to the position information associated with the other identifiers present in the table.

For example, to trigger this update 106 of the table of the geolocation server 50, the server 32 of the access network 30 emits a message intended to add the identifier of the transmitting device 40 and its associated piece of position information. This message may be emitted directly to the geolocation server 50 or to an intermediate entity responsible for the maintenance of the table of the geolocation server 50.

In the case where the identifier of the transmitting device 40 detected by the terminal 20 and received by the access network 30 is already present in the table, the method 100 includes a step 104 of checking consistency between the piece of position information of the terminal 20 determined by the access network 30 and at least one piece of position information associated with the identifier of the transmitting device 40 in the table. For a piece of position information associated with the identifier of the transmitting device 40 in the table, the piece of position information of the terminal 20 determined by the access network 30 and the piece of position information associated with the identifier of the transmitting device 40 in the table are considered to be consistent with each other if they are representative of geographical positions that are close enough to each other.

In particular, this consistency check step 104 may include a comparison (cf. steps 203 and 304 hereinafter) of the piece of position information of the terminal 20 determined by the access network 30 with the piece of position information associated with the identifier of the transmitting device 40 in the table. For example, this comparison may include:

- an estimation of a first geographical position from the piece of position information of the terminal 20 determined by the access network,
- an estimation of a second geographical position from the piece of position information associated with the identifier of the transmitting device 40 in the table,
- comparing a distance between the first geographical position and the second geographical position with a threshold value.

In particular implementations, this comparison may further include:

- determining a first value representative of a level of accuracy of the estimate of the first geographical position, and/or
- determining a second value representative of a level of accuracy of the estimate of the second geographical position.

For example, these values representative of a level of accuracy correspond to a radius of a circular area around the estimated geographical position for which the terminal 20 is estimated to be located inside said circular area with a predetermined level of probability. The threshold value could then be defined according to the first value and/or according to the second value.

For example, if we denote $P_1$ the first geographical position estimated from the piece of position information of the terminal 20 determined by the access network 30; $R_1$ the value representative of the level of accuracy of the estimate of the first geographical position (radius around the first geographical position in which the terminal is deemed to be present with a certain level of probability, for example 90%); $P_2$ the second geographical position estimated from the piece of position information associated with the identifier of the transmitting device 40 in the table; $R_2$ the value representative of the level of accuracy of the estimate of the second geographical position; dist($P_1$, $P_2$) the distance between $P_1$ and $P_2$; then it is possible to determine the result of the consistency check 104 according to the following expression:

$$dist(P_1, P_2) \le f(R_1, R_2) \quad \text{[Math. 1]}$$

If this expression is false, then there is an inconsistency between the piece of position information of the terminal 20 determined by the access network 30 with the piece of position information associated with the identifier of the transmitting device 40 in the table. On the other hand, if this expression is true, then the piece of position information of the terminal 20 determined by the access network 30 is consistent with the piece of position information associated with the identifier of the transmitting device 40 in the table. As a non-limiting example, the function $f$ may be defined as follows (the result of the functions dist and $f$ are for example values in metres)

$$f(R_1, R_2) = 3 \times (R_1 + R_2) + 500 \quad \text{[Math. 2]}$$

In the case where the piece of position information is a piece of contextual information, and not directly a geographical position, the piece of contextual information representing the position of the terminal determined by the access network 30 may be compared with the piece of contextual information associated with the identifier of the transmitting device 40 in the table. This comparison may possibly be implemented using a reverse geocoding type application.

The use of a piece of contextual information may be particularly advantageous if the time of reception of the identifier of the transmitting device 40 by the terminal 20 and the time of emission of the message including said identifier by the terminal to the access network 30 are different (this may be the case in a data integrity process replaying messages not received by the access network during a first emission).

It should also be noted that the message emitted by the terminal 20 to the access network 30 may include several identifiers of transmitting devices 40 detected by the terminal 20 at close time points (or the terminal 20 may send several messages at close time points, each message including a different transmitting device 40 identifier). In such a case, the contextual information associated with a transmitting device identifier may correspond to the knowledge of the identifiers of the other transmitting devices detected at close time points (and therefore probably located at close positions). For example, if the terminal 20 emits a message including three identifiers of different transmitting devices detected at close time points, and if the piece of position information of the terminal 20 is deemed to be consistent with the piece of position information of the table for only two transmitting devices out of three, then it is possible to conclude that the piece of position information for the third transmitting device is not consistent and should be updated.

In the case where several identifiers of different transmitting devices 40 detected by the terminal 20 are received by the access network 30 in the same message (or in several messages transmitted at close time points), for at least one of the received identifiers, called "identifier of interest", the consistency check 104 may comprise the following steps:

determining a piece of position information from the position information associated in the table with a plurality of identifiers among the received identifiers, the identifier of interest being included in said plurality of identifiers, a first check of consistency of the piece of position information thus determined with the piece of position information of the terminal 20 determined by the access network 30, if the first consistency check indicates an inconsistency, a second check of consistency between the piece of position information associated in the table with the identifier of interest and the piece of position information of the terminal 20 determined by the access network 30.

In other words, the piece of position information of the terminal 20 is first compared with one or more piece(s) of position information determined for one or more tuple(s) of identifiers built from the received identifiers. A first consistency check is then carried out between the piece of position information of the terminal 20 estimated without the geolocation server 50 and the piece(s) of position information determined by the geolocation server 50 from said tuples of identifiers. If an inconsistency is noticed, a second consistency check and a possible correction may be performed for each identifier of the considered tuple. It should be noted that additional information could be used to weight the corrections of the different identifiers composing a tuple. For example, these additional information may correspond to power levels at which the different messages including the identifiers have been received by the terminal 20 originating from the different detected transmitting devices 40.

In particular, such arrangements may allow reducing the number of requests emitted to the geolocation server 50 (one single request including a plurality of identifiers is emitted to the geolocation server in a first step, and individual requests relating to one single identifier are emitted only if an inconsistency is observed between the piece of position information of the terminal 20 and the piece of position information determined by the geolocation server 50 from the plurality of identifiers). This may prove useful in particular in the case where the consistency check is carried out by the access network 30 (for example if, for reasons relating to personal data protection, the piece of position information of the terminal 20 cannot be supplied to the geolocation server 50).

Finally, the method 100 includes a step 105 of updating the table according to the result of the consistency check. If the result of the consistency check step 104 indicates that the piece of position information in the table of the geolocation server 50 is not consistent with the piece of position information of the terminal 20 determined by the access network 30 (for example if the distance between the two positions is greater than the threshold value), then the piece of position information in the table should be corrected. Otherwise, the piece of position information in the table could be validated.

According to a first example, when the result of the check step 104 indicates an inconsistency, then the update step 105 consists in replacing in the table the piece of position information associated with the transmitting device 40 by the piece of position information of the terminal 20 determined by the access network 30.

According to another example, when the result of the check step 104 indicates an inconsistency, then the update step 105 could simply consist of invalidating in the table the piece of position information associated with the transmitting device 40.

According to another example, the table may include at least two pieces of position information associated with the same transmitting device 40, each piece of position information also being associated with a trust value representative of the confidence granted to said piece of position information for said transmitting device 40. The update step 105 may then include an addition (if this association is not already present in the table), of an association between the transmitting device 40 and the piece of position information of the terminal 20 determined by the network access 30, and/or an update of the trust values of the different position information associated with the transmitting device. For example, if the result of the check 104 indicates an inconsistency, then the trust value associated with the piece of position information of the terminal 20 determined by the access network will be greater than the trust value associated with the piece of position information of the table that has been considered to be inconsistent.

For example, the trust value associated with a piece of position information of the transmitting device 40 is defined according to the number of times said piece of position information has been considered to be consistent. Such arrangements allow progressively increasing the trust granted to a piece of position information over time.

The trust value associated with a piece of position information of the transmitting device 40 may also be defined according to an estimated level of accuracy for said piece of position information (like for example according to the previously-described values $R_1$ and/or $R_2$).

The trust value associated with a piece of position information of the transmitting device 40 may also be defined according to the date of the last update of the piece of position information (the more this last update is recent, the greater the trust value could be).

Advantageously, when several pieces of position information are associated with the same transmitting device 40, it is possible to increase the accuracy of the estimate of the position of the transmitting device 40 by aggregating via an estimator (for example via a barycenter or a median) of the consistent yet slightly different pieces of position information (for example the piece of position information having a trust value greater than a predetermined threshold).

In the case where one or more transmitting device identifier(s) detected by the terminal 20 at close time points and received by the access network 30 are not included in the table of the geolocation server 50, then the reception by the geolocation server 50 of the unknown identifier(s) may result in the insertion of the identifier(s) into the table (step 106). These are then each associated with a piece of position information.

If several identifiers have been received and some identifiers are present in the table, then it is possible to use the piece of position information associated with the identifiers present in the table to estimate a piece of position information for the unknown identifiers. The piece of position information of the terminal can then be used to check the consistency and/or to refine a piece of position information thus estimated from the known identifiers (by methods similar to those described before for the consistency check 104 and update 105 steps).

If none of the received identifiers is present in the table, in other words if all of the received identifiers are unknown, then the piece of position information of the terminal determined by the access network can be associated with each unknown identifier inserted into the table.

Figure 4:
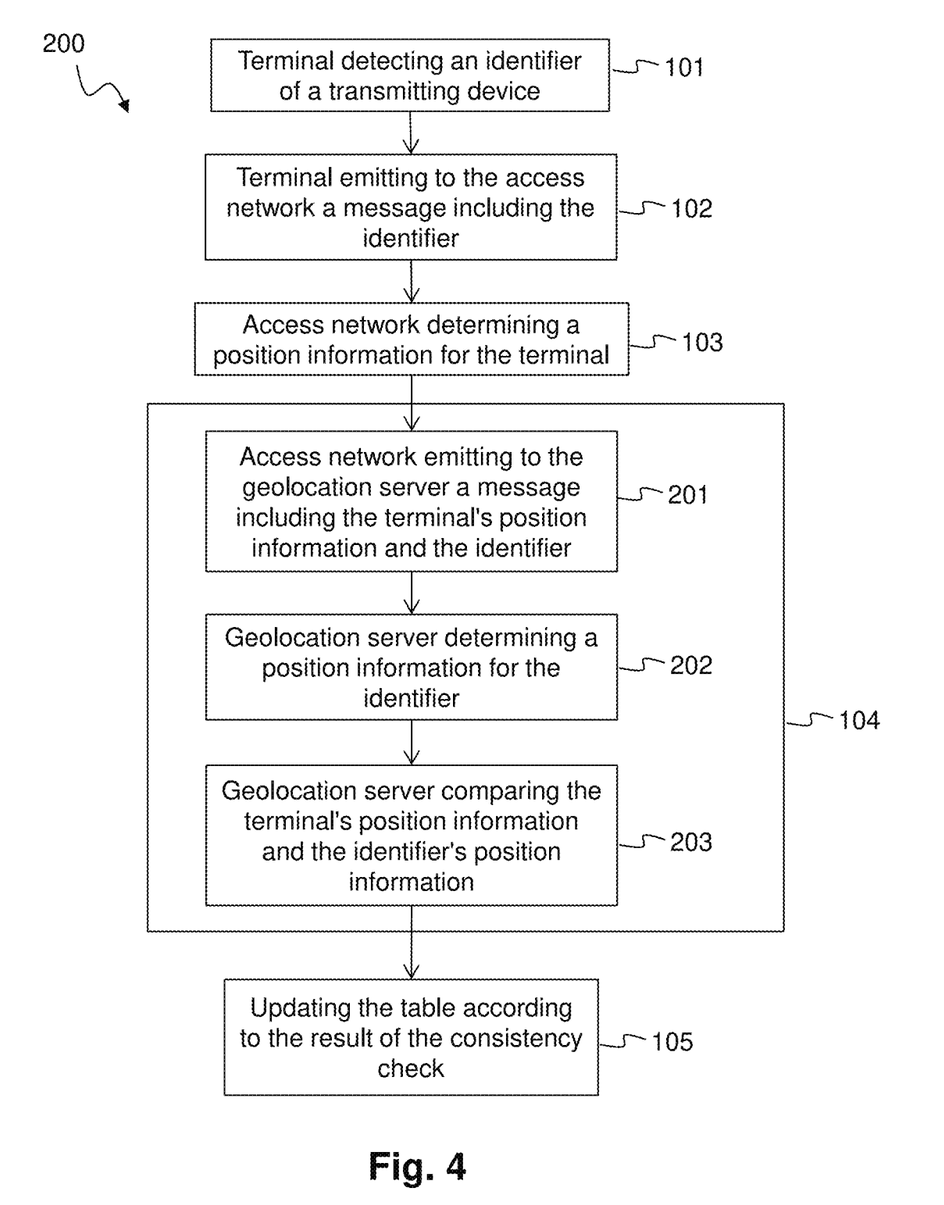

FIG. 4 schematically shows the main steps of a first particular implementation of a method 200 for updating the geolocation server 50 when the identifier of the transmitting device 40 detected by the terminal 20 and received by the network access 30 is already present in the table.

In this particular implementation, steps 101 to 105 are identical to those described hereinabove with reference to FIG. 3. Nonetheless, the consistency check step 104 is detailed.

The consistency check step 104 firstly includes emitting 201, by the access network 30, to the geolocation server 50, a message including the piece of position information of the terminal 20 determined by the access network 30 and the identifier of the transmitting device 40. This step is implemented by the server 32 of the access network 30.

Afterwards, the consistency check step 104 includes determining 202, by the geolocation server 50, one or more piece(s) of position information associated with the identifier of the transmitting device 40 in the table.

Afterwards, the consistency check step 104 includes comparing 203, by the geolocation server 50, the piece of position information of the terminal 20 determined by the access network 30 with the piece(s) of position information associated with the identifier of the transmitting device 40 in the table. In this case, the step 105 of updating the table may be implemented entirely by the geolocation server 50 according to the result of the comparison 203 performed by the geolocation server 50, and using the piece of position information of the terminal 20.

Figure 5:
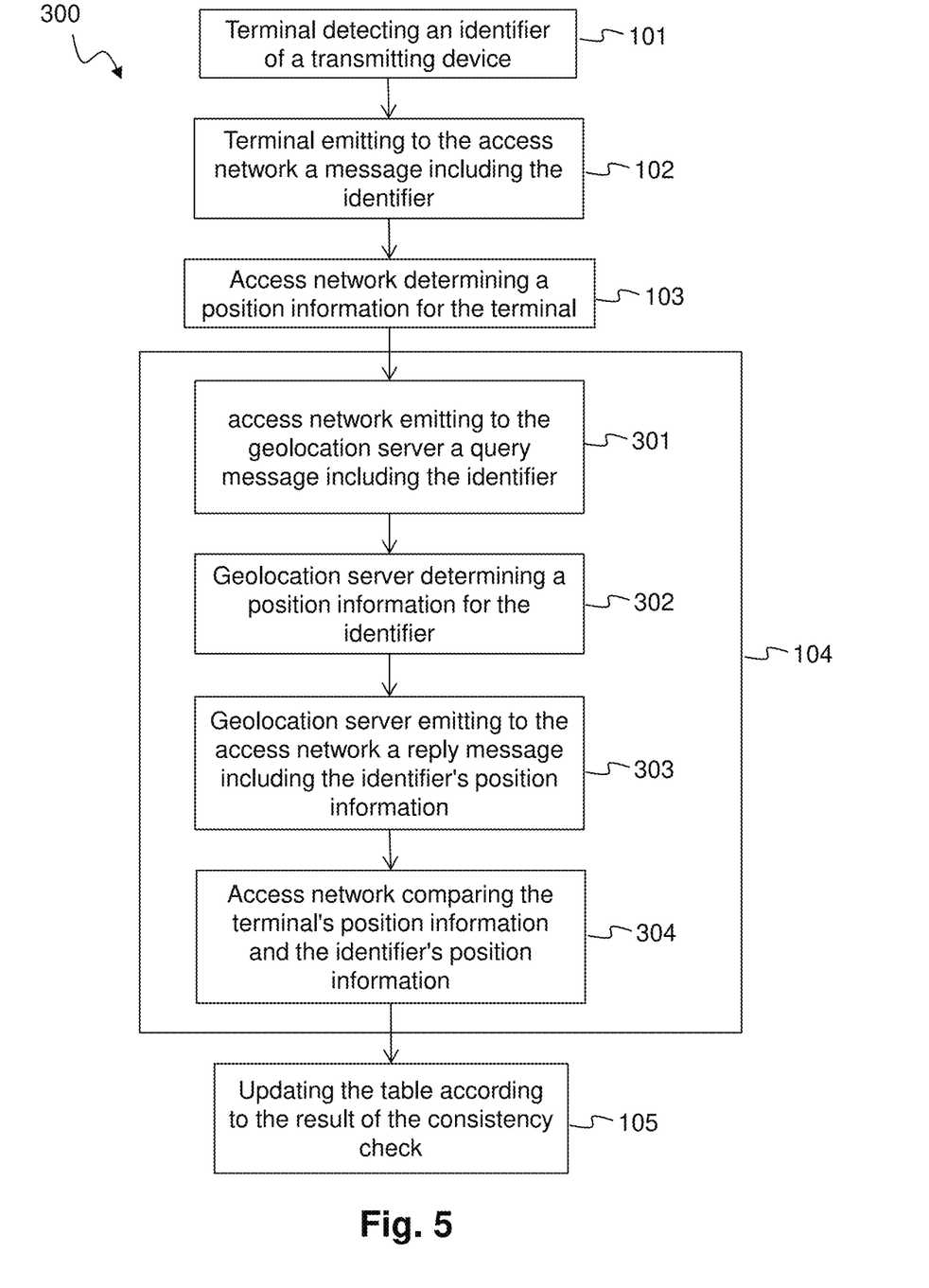

FIG. 5 schematically shows the main steps of a second particular implementation of a method 300 for updating the geolocation server 50 when the identifier of the transmitting device 40 detected by the terminal 20 and received by the access network 30 is already present in the table.

In this particular implementation, steps 101 to 105 are identical to those described hereinabove with reference to FIG. 3. Nonetheless, the consistency check step 104 is detailed.

First, the consistency check step 104 includes emitting 301, by the access network 30, to the geolocation server 50, a query message including the identifier of the transmitting device.

Afterwards, the consistency check step 104 includes determining 302, by the geolocation server 50, one or more piece(s) of position information associated with the identifier of the transmitting device 40 in the table.

Afterwards, the consistency check step 104 includes emitting 303, by the geolocation server 50, to the access network 30, a reply message including the piece(s) of position information associated with the identifier of the transmitting device 40 in the table.

Afterwards, the consistency check step 104 includes comparing 304, by the access network 30, the piece of position information of the terminal 20 determined by the access network 30 with the piece(s) of position information associated with the identifier of the transmitting device 40 in the table.

In the considered example, for this second particular implementation, the step 301 of emitting the query message, the reception of the reply message, and the step 304 of comparing the piece of position information of the terminal 20 determined by the access network 30 with the piece(s) of position information associated with the identifier of the transmitting device 40 in the table are implemented by the server 32 of the access network 30. To trigger the step 105 of updating the table of the geolocation server 50, the server 32 of the access network 30 may emit a message intended to update the table. This message may be emitted directly to the geolocation server 50 or to an intermediate entity responsible for the maintenance of the table of the geolocation server 50.

The invention has been described hereinabove in a scenario where the consistency update step 104 and the step 105 of updating the piece of position information of a transmitting device 40 in the table are implemented in response to the reception of a message emitted by a terminal 20 and including the identifier of the transmitting device 40. Nonetheless, it should be noted that the invention is not necessarily implemented message-by-message, and the server 32 of the access network 30 may in particular be configured to collect several messages before implementing the consistency check 104 and update 105 steps. Indeed, it could be complex and costly to update a database on a "continuous" basis, and it could be more advantageous to group together checks and/or corrections to be made to the database.

In other words, the consistency check step 104 and the step 105 of updating the table (and possibly the step 103 of determining the piece of position information) may be delayed until a predetermined criterion is met. In particular, this criterion may correspond to the expiration of a waiting period, to the fact that a given number of messages including a transmitting device identifier has been received, or to the fact that a given number of transmitting device identifiers have been received (indeed, the same message may contain several transmitting device identifiers). Nonetheless, other criteria may be considered to delay, and therefore group together, the implementation of the steps of checking the consistency 104 and updating 105 the table for several identifiers of different transmitting devices.

It is also possible to consider delaying the update step 105 with respect to the consistency check step 104.

In other words, it is possible, at the server 32 of the access network 30, to check the consistency of the piece of position information associated with several transmitting device identifiers received in several messages received from terminals of the system, and to subsequently send one single message intended to update the table for all of the identifiers for which an inconsistency has been observed. It is possible to process the different messages received from the terminals 20 on a unitary basis (one-by-one) or by batches of messages (i.e. it is possible to process at a given time point several messages received over a given period of time).

The server 32 of the access network 30 and the geolocation server 50 may be configured to implement any one of the previously-described implementation of the method according to the invention for updating the database of the geolocation server 50.

Any type of interface may be considered between the server 32 of the access network 30 and the geolocation server 50, in particular for sending a message intended to update the table of the geolocation server 50. In particular, it is possible to consider the use of a file, a programming interface, a callback function, etc. for the emission of information relating to updates to the table.

The description hereinbefore clearly illustrates that, through its different features and their advantages, the present invention achieves the intended objectives.

Advantageously, the invention is based on the fact that the access network 30 is, independently (i.e. without using the geolocation server 50), capable of determining a piece of information on the geographical position of the terminal 20 in order to verify the validity of a piece of position information of the transmitting device 40 in the table of the geolocation server 50. The piece of position information of the transmitting device 40 in the table of the geolocation server 50 is considered to be valid if the piece of position information of the terminal 20 determined by the access network 30 is consistent with the piece of position information of the transmitting device 40 in the table of the geolocation server 50. The table of the geolocation server 50 could then be updated to correct the piece of position information of the transmitting device 40 if an inconsistency is observed.

The invention claimed is:

1. A method for updating a database of a geolocation server using a wireless communication system, said database including a table storing identifiers of transmitting devices, each transmitting device identifier being associated in the table with at least one piece of position information representative of the geographical position of the transmitting device, said wireless communication system including an access network and at least one terminal adapted to exchange messages with the access network according to a first wireless communication protocol and to receive messages emitted by the transmitting devices according to a second wireless communication protocol, said method including:

detecting, by the terminal, for at least one transmitting device, an identifier of said transmitting device from a message emitted by said transmitting device according to the second wireless communication protocol, emitting, by the terminal, to the access network and according to the first wireless communication protocol, a message including the identifier of the transmitting device, determining, by the access network, without using the geolocation server, a piece of position information representative of the geographical position of the terminal, said method implementing either one or both of the following two possibilities:

when the identifier of the transmitting device is present in the table:

performing a consistency check between the piece of position information of the terminal determined by the access network and at least one piece of position information associated with the identifier of the transmitting device in the table, updating the table according to the result of the consistency check, when the identifier of the transmitting device is not present in the table, updating the table by adding the identifier of the transmitting device associated with a piece of position information determined according to the piece of position information of the terminal determined by the access network.

2. The method according to claim 1, wherein the consistency check includes:

emitting, by the access network, to the geolocation server, a message including the piece of position information of the terminal determined by the access network and the identifier of the transmitting device, determining, by the geolocation server, said at least one piece of position information associated with the identifier of the transmitting device in the table, comparing, by the geolocation server, the piece of position information of the terminal determined by the access network with said at least one piece of position information associated with the identifier of the transmitting device in the table.

3. The method according to claim 2, wherein comparing of the piece of position information of the terminal determined by the access network with said at least one piece of position information associated with the identifier of the transmitting device in the table includes:

estimating a first geographical position from the piece of position information of the terminal determined by the access network, estimating a second geographical position from said at least one piece of position information associated with the identifier of the transmitting device in the table, comparing a distance between the first geographical position and the second geographical position with a threshold value.

4. The method according to claim 3, wherein comparing the piece of position information of the terminal determined by the access network with said at least one piece of position information associated with the identifier of the transmitting device in the table further includes:

determining a first value representative of a level of accuracy of the estimate of the first geographical position, and/or determining a second value representative of a level of accuracy of the estimate of the second geographical position, and wherein the threshold value is defined according to the first value and/or according to the second value.

5. The method according to claim 1, wherein the consistency check includes:

emitting, by the access network, to the geolocation server, a query message including the identifier of the transmitting device, determining, by the geolocation server, said at least one piece of position information associated with the identifier of the transmitting device in the table, emitting, by the geolocation server, to the access network, a reply message including said at least one piece of position information associated with the identifier of the transmitting device in the table, comparing, by the access network, the piece of position information of the terminal determined by the access network with said at least one piece of position information associated with the identifier of the transmitting device in the table.

6. The method according to claim 1, wherein the update of the table according to the result of the consistency check includes replacing, in the table, said at least one piece of position information associated with the transmitting device by the piece of position information of the terminal determined by the access network.

7. The method according to claim 1, wherein the table can include at least two pieces of position information associated with the same transmitting device, each piece of position information being also associated with a trust value representative of the trust given to said piece of position information for said transmitting device, and the update of the table according to the result of the consistency check includes adding, in the table, an association between the transmitting device and the piece of position information of the terminal determined by the access network, and/or updating, in the table, the trust values of the different pieces of position information associated with the transmitting device.

8. The method according to claim 1, wherein at least the steps of performing the consistency check and updating the table are delayed until a particular criterion is met.

9. The method according to claim 8, wherein the particular criterion is met:

when a predetermined waiting period has expired, and/or when a number of received messages including at least one transmitting device identifier is greater than a predetermined threshold, and/or when a number of received transmitting device identifiers is greater than a predetermined threshold.

10. The method according to claim 1, wherein several identifiers of different transmitting devices detected by the terminal are received by the access network in one single message emitted by the terminal or in several messages emitted by the terminal during a predetermined period of time and, for at least one of the received identifiers, so-called "identifier of interest", the consistency check comprises:

determining a piece of position information from the pieces of position information associated in the table with a plurality of identifiers among the received identifiers, the identifier of interest being included in said plurality of identifiers, a first consistency check of the piece of position information thus determined with the piece of position information of the terminal determined by the access network, if the first consistency check indicates an inconsistency, a second consistency check between the piece of position information associated in the table with the identifier of interest and the piece of position information of the terminal determined by the access network.

11. The method according to claim 1, wherein the first wireless communication protocol has a range longer than the range of the second wireless communication protocol.

12. The method according to claim 1, wherein the first wireless communication protocol is a communication protocol of one of a wireless wide area network er of and a low-power wireless wide area network.

13. The method according to claim 1, wherein the second wireless communication protocol is a communication protocol of one of a wireless local area network, a communication protocol of a wireless personal area network er and a short-distance communication protocol.

14. A server of an access network of a wireless communication system used to update a database of a geolocation server, said database including a table storing identifiers of transmitting devices, each transmitting device identifier being associated in the table with at least one piece of position information representative of the geographical position of the transmitting device, said wireless communication system also including at least one terminal adapted to exchange messages with the access network according to a first wireless communication protocol and for receiving messages transmitted by the transmitting devices according to a second protocol wireless communication, said server being configured to:

receive a message emitted by the terminal according to the first wireless communication protocol, said message including at least one identifier of a transmitting device detected by the terminal, determine, without using the geolocation server, a piece of position information representative of the geographical position of the terminal, emit to the geolocation server a query message including the identifier of the transmitting device, said server being further configured to implement either one or both of following possibilities:

when the identifier of the transmitting device is present in the table:

receive from the geolocation server a reply message including at least one piece of position information associated with the identifier of the transmitting device in the table, perform a consistency check between the piece of position information of the terminal determined by the access network and said at least one piece of position information associated with the identifier of the transmitting device in the table, emit a message intended to update the table according to the result of the consistency check when the identifier of the transmitting device is not present in the table, emit a message intended to add into the table the identifier of the transmitting device associated with a piece of position information determined according to the piece of position information of the terminal determined by the access network.

15. An access network including a server according to claim 14.

16. The access network according to claim 15, said access network being one of a wireless wide area network and a low-power wireless wide area network.

17. The access network according to claim 15, said access network being an access network of an ultra-narrowband communication system.

\* \* \* \* \*